US012636760B2

(12) United States Patent
Junkers et al.

(10) Patent No.: US 12,636,760 B2
(45) Date of Patent: May 26, 2026

(54) APPARATUS FOR TIGHTENING THREADED FASTENERS

(71) Applicant: HYTORC Division UNEX Corporation, Mahwah, NJ (US)

(72) Inventors: Eric P. Junkers, Hoboken, NJ (US); Peter Koppenhoefer, East Stroudsburg, PA (US)

(73) Assignee: HYTORC Division UNEX Corporation, Mahwah, NJ (US)

( * ) Notice: Subject to any disclaimer, the term of this patent is extended or adjusted under 35 U.S.C. 154(b) by 738 days.

(21) Appl. No.: 16/639,365

(22) PCT Filed: Aug. 16, 2018

(86) PCT No.: PCT/US2018/046826
§ 371 (c)(1),
(2) Date: Feb. 14, 2020

(87) PCT Pub. No.: WO2019/036550
PCT Pub. Date: Feb. 21, 2019

(65) Prior Publication Data

US 2020/0254595 A1 Aug. 13, 2020

Related U.S. Application Data

(60) Provisional application No. 62/546,498, filed on Aug. 16, 2017.

(51) Int. Cl.
*B25B 21/00* (2006.01)
*B25B 23/00* (2006.01)

(52) U.S. Cl.
CPC ........ *B25B 21/005* (2013.01); *B25B 23/0078* (2013.01)

(58) Field of Classification Search
CPC ..... B25B 21/005; B25B 21/02; B25B 21/026; B25B 23/0078; B25B 21/004;
(Continued)

(56) References Cited

U.S. PATENT DOCUMENTS 2,925,103 A * 2/1960 Kerr .......................... F16K 15/20 141/349
4,541,309 A * 9/1985 Herrick ................. B25B 21/004 81/57.39

(Continued)

*Primary Examiner* — Robert J Scruggs
(74) *Attorney, Agent, or Firm* — Justin B. Bender, Esq.

(57) ABSTRACT

An apparatus for use with a hydraulically driven torque tool for tightening or loosening threaded fasteners including an internal energy storage assembly for automatic piston return is disclosed. In one embodiment, the internal energy storage assembly operates by a pneumatic fluid which compresses during an advance stroke of a piston assembly of the tool and expands during a retract stroke of the piston assembly of the tool. In such embodiment, the internal energy storage assembly includes a hydraulic assembly and a pneumatic assembly. Advantageously it: has a higher energy density than a mechanical spring; does not have geometric limitations as the pneumatic fluid may be contained in internal volume available of the tool; and increases bolting speeds as the return stroke no longer requires hydraulic fluid to force back the piston; has reduced tool size by elimination of one hydraulic connection and location of the remaining connection that improves accessibility of the tool into the work space; requires a simplified hydraulic pump and controls; and increases bolting system reliability.

14 Claims, 3 Drawing Sheets

(58) Field of Classification Search
CPC ....... B25B 13/00; B25B 13/46; B25B 13/463; B25B 21/002; B25B 23/145; B25B 23/147; B25B 23/151; B25B 23/155; B25B 23/157; B25B 21/00; B25B 23/00
See application file for complete search history.

(56) References Cited

U.S. PATENT DOCUMENTS

| | | | | | |
|---|---|---|---|---|---|
| 4,805,496 | A * | 2/1989 | Wagner | B25B 21/005 | 81/57.39 |
| 4,921,010 | A * | 5/1990 | Spirer | F16L 39/04 | 137/580 |
| 5,668,328 | A * | 9/1997 | Steber | B25B 21/005 | 73/862.23 |
| 2006/0053981 | A1 * | 3/2006 | Shaw | B25B 21/005 | 81/57.39 |
| 2015/0165602 | A1 * | 6/2015 | Seith | B26B 11/003 | 173/46 |

* cited by examiner

APPARATUS FOR TIGHTENING THREADED FASTENERS

CROSS REFERENCE TO RELATED APPLICATIONS AND/OR PATENTS

This application either claims priority to and/or is either a divisional, continuation or continuation-in-part application of the following commonly owned patent application, an entire copy of which is incorporated herein by reference: U.S. Application Ser. No. 62/546,498, having Filing Date of 16 Aug. 2017, entitled "Automatic Hydraulic Piston Return For Torque Power Tools".

Innovations disclosed in this application advance technology disclosed in the following commonly owned issued patents and/or patent application, entire copies of which are incorporated herein by reference: U.S. Pat. No. 4,921,010, having Issue Date of May 1, 1990, entitled "Swivel Connector"; U.S. Pat. No. 4,961,445, having Issue Date of Oct. 9, 1990, entitled "Connecting Device for Connecting Liquid Consumer to Liquid Source"; U.S. Pat. No. 5,311,796, having Issue Date of May 17, 1994, entitled "Hydraulic Tool"; U.S. Pat. No. 6,089,265, having Issue Date of Jul. 18, 2000, entitled "Multi-Swivel Connector for Connecting a Fluid Operated Tool to a Source of Fluid"; and U.S. application Ser. No. 14/241,531, having Filing Date of 27 Feb. 2014, entitled "APPARATUS FOR TIGHTENING THREADED FASTENERS".

BACKGROUND

Hydraulically powered bolting tools using a hydraulic cylinder require energy (hydraulic pressure and flow) to operate. Storage of mechanical energy (i.e. potential energy) can be accomplished using springs, weights, heat and compressible fluids (i.e. gases). Of these, for practical reasons, only springs or gas make sense for a portable tool. Prior designs exist that use a mechanical spring to store the energy required to retract the cylinder. The energy density of a mechanical spring is limited to the capacity of the spring material to deflect (strain) without permanent deformation. As such hydraulic tools using mechanical springs require significant volume to house the spring.

In other versions, separate hydraulic lines are required to advance and retract the cylinder. It is desirable to minimize the number of connections which benefits tool size, ease of use, reliability and reduces the complexity of the hydraulic pump.

By integrating an internal energy storage device to provide the means to retract the cylinder it is possible to eliminate the hydraulic line and associated hoses, couplings, seals, pump valving and controls normally required to provide the retract function. Additionally eliminating the retract hydraulic connection allows for positioning of the advance connection in a location that reduces the tools footprint and creates improved accessibility.

SUMMARY

An apparatus for use with a hydraulically driven torque tool for tightening or loosening threaded fasteners including an internal energy storage assembly for automatic piston return is disclosed. In one embodiment, the internal energy storage assembly operates by a pneumatic fluid which compresses during an advance stroke of a piston assembly of the tool and expands during a retract stroke of the piston assembly of the tool. In such embodiment, the internal energy storage assembly includes a hydraulic assembly and a pneumatic assembly. Advantageously it: has a higher energy density than a mechanical spring; does not have geometric limitations as the pneumatic fluid may be contained in internal volume available of the tool; and increases bolting speeds as the return stroke no longer requires hydraulic fluid to force back the piston; has reduced tool size by elimination of one hydraulic connection and location of the remaining connection that improves accessibility of the tool into the work space; requires a simplified hydraulic pump and controls; and increases bolting system reliability.

BRIEF DESCRIPTION OF THE DRAWINGS

The inventions of the present application may be described, by way of example only, with reference to the accompanying drawings, of which.

SPECIFICATION

Figure 1A:
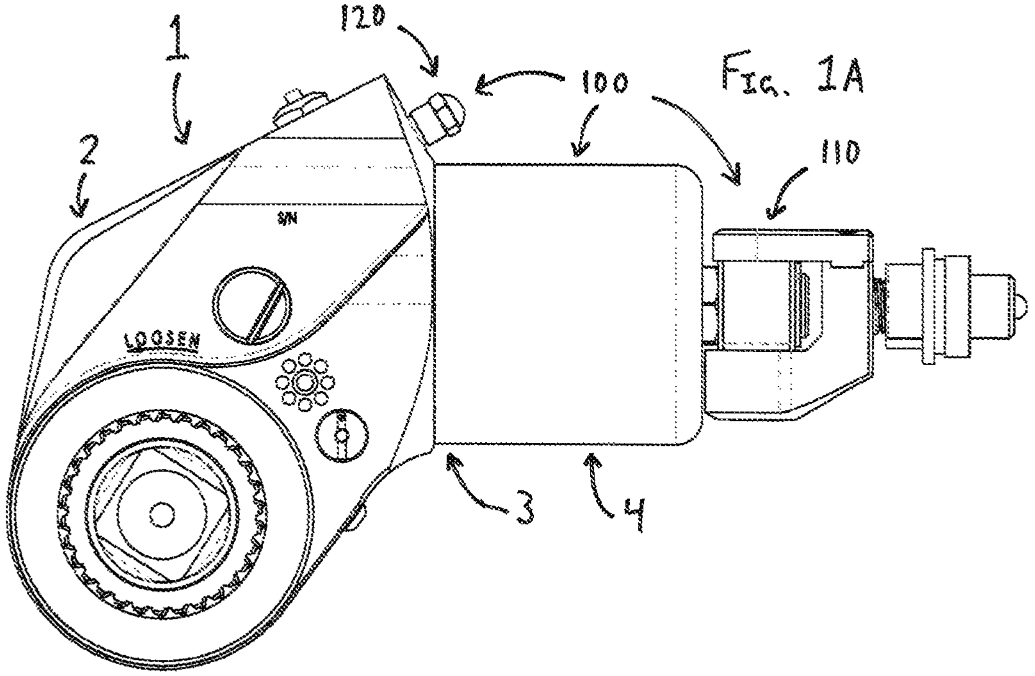
FIGS. 1A-1B are side and back views of a first embodiment of an apparatus.
Figure 1B:
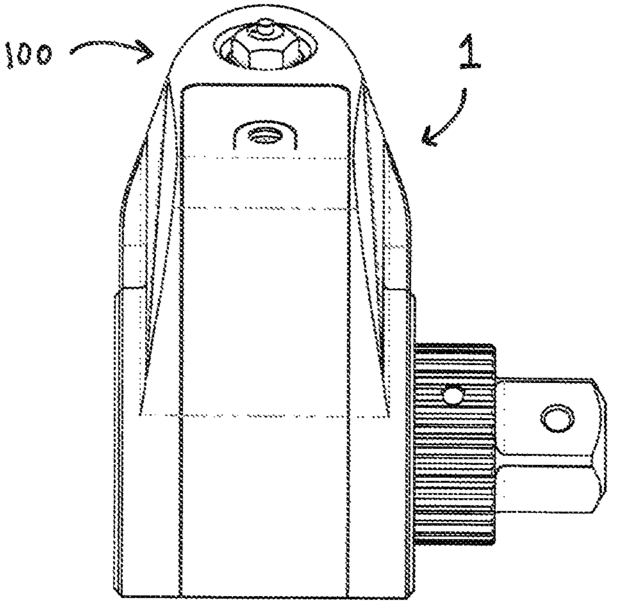

Referring to FIGS. 1A-1B, by way of example, these show an automatic piston return apparatus 100 for use with a hydraulically driven torque tool 1 for tightening or loosening threaded fasteners. In this embodiment, an internal energy storage assembly operates by a pneumatic fluid which compresses during an advance stroke of a piston assembly of tool 1 and expands during a retract stroke of the piston assembly of tool 1. In such embodiment, the apparatus includes a hydraulic assembly 110 and a pneumatic assembly 120.

Figure 2:
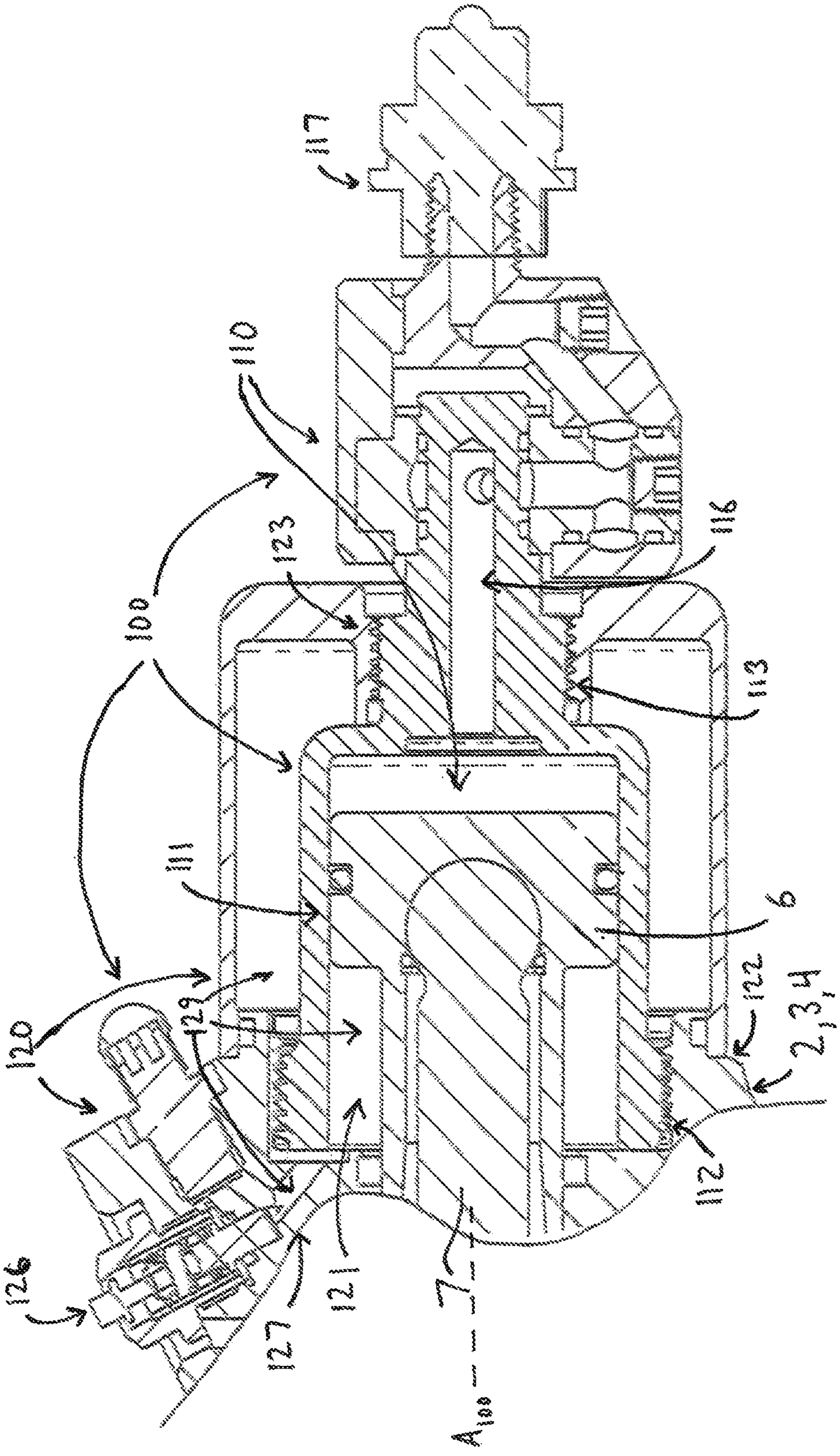
FIG. 2 is a cross-sectional view of the apparatus of FIGS. 1A-1B.

Referring to FIG. 2, by way of example, this shows a cross-sectional view of apparatus 100 attachable with a reaction support portion 3 of a housing 2 of tool 1 for tightening or loosening threaded fasteners and a piston assembly 4. Tool 1, internal portions of which are not shown in FIG. 2, includes housing 2 having two housing portions, a cylinder portion and a driving portion. Piston assembly 4 is arranged in the cylinder portion and includes a piston 6 reciprocatingly movable in the cylinder portion along a piston, or first axis $A_{100}$, and a piston rod 7 connected with piston 6. Not shown, a known lever-type ratchet mechanism is arranged in the driving portion, connected to and drivable by piston assembly 4, and includes a ratchet. The ratchet is turnable about a turning force axis, which is perpendicular to piston axis $A_{100}$. The ratchet is connected with a driving element, which receives a first turning force acting about the turning force axis in one direction during operation of tool 1. First turning force turns a deep well hex socket attached to the driving element, which turns a fastener. Reaction support portion 3, formed on a part of the cylinder portion, receives a second turning, or reaction, force acting about the turning force axis in another direction during operation of tool 1. Reaction support portion 3 is formed of an annular body about piston axis $A_{100}$. Note that any known fluid operated tool for tightening or loosening threaded fasteners having any known components may be substituted for tool 1.

Automatic piston return apparatus 100 includes an internal energy storage assembly having hydraulic assembly 110 and pneumatic assembly 120. Hydraulic assembly 110 includes a hydraulic cylinder assembly 111 and a hydraulic swivel assembly 116. Pneumatic assembly 120 includes a pneumatic cylinder assembly 121 and a pneumatic fill valve assembly 126.

Hydraulic cylinder assembly 111 has a first end 112 attachable to housing 2 and piston assembly 4 of the tool and a second end 113 attachable to hydraulic swivel assembly 116. Hydraulic swivel assembly 116 supplies hydraulic fluid to tool 1 and includes a single hydraulic connection 117 rather than a plurality of hydraulic connections. The single hydraulic connection is coaxial with piston axis $A_{100}$, which minimizes the space required to accommodate the hydraulic connection to tool 1 for limited clearance bolting applications. Hydraulic swivel assembly 116 is rotatable approximately 180°×360° and may also include a quick connect coupler to the single hydraulic connection.

Pneumatic cylinder assembly 121 has a first end 122 attachable to housing 2 and first end 112 of hydraulic cylinder assembly 111. Pneumatic cylinder assembly 121 has a second end 123 attachable to second end 113 of hydraulic cylinder assembly 111 and hydraulic swivel assembly 116. Pneumatic cylinder assembly 121 further has a pneumatic fill valve assembly 126 and a pneumatic fluid conduit 127.

Generally, hydraulic assembly 110 and pneumatic assembly 120 are removably, sealably and/or fluidly attachable to each other and tool 1 to allow the pneumatic fluid to compress during an advance stroke of piston assembly 4 and to expand during a retract stroke of piston assembly 4. More specifically, first end 112 is removably and sealably attachable to housing 2 of tool 1; second end 113 is sealably and fluidly attachable to hydraulic swivel assembly 116; first end 122 is removably and sealably attachable to housing 2 of tool 1 and sealably and fluidly attachable to pneumatic fill valve assembly 126 and first end 112; and second end 123 is removably and sealably attachable to second end 113.

Pneumatic fill valve assembly 126 may include either a Schrader valve or a Presta valve and/or a pneumatic fluid pressure sensor. Pneumatic assembly 120 is pre-charged with a gas, such as air or nitrogen, through such valve. The pneumatic fluid pressure sensor monitors the gas pressure and alerts the user if the pressure drops below acceptable levels after prolonged storage, usage or leak.

Apparatus 100 includes a pneumatic fluid pressure vessel 129, which is defined by: a first static volume formed between an inner wall of pneumatic assembly 110 and an outer wall of hydraulic assembly 120; a dynamic volume formed between an inner wall of hydraulic assembly 120 and an outer wall of piston assembly 4; and a second static volume formed within pneumatic fluid conduit 127 connecting pneumatic fluid conduit 127, the first static volume and the dynamic volume. During operation of tool 1, the pneumatic fluid compresses during the advance stroke of piston assembly 4, which reduces the dynamic volume behind piston 6. Likewise, the pneumatic fluid expands during the retract stroke of piston assembly 4, which increases the dynamic volume behind piston 6. Accordingly, bolting speed requires less time as the return stroke no longer requires hydraulic fluid to force back piston 6. Such volumes allows for a form factor similar to current two hose hydraulic tools. Note that pressures of the pneumatic fluid and the hydraulic fluid may exceed approximately 400 psi and 10,000 psi, respectively.

Figure 3:
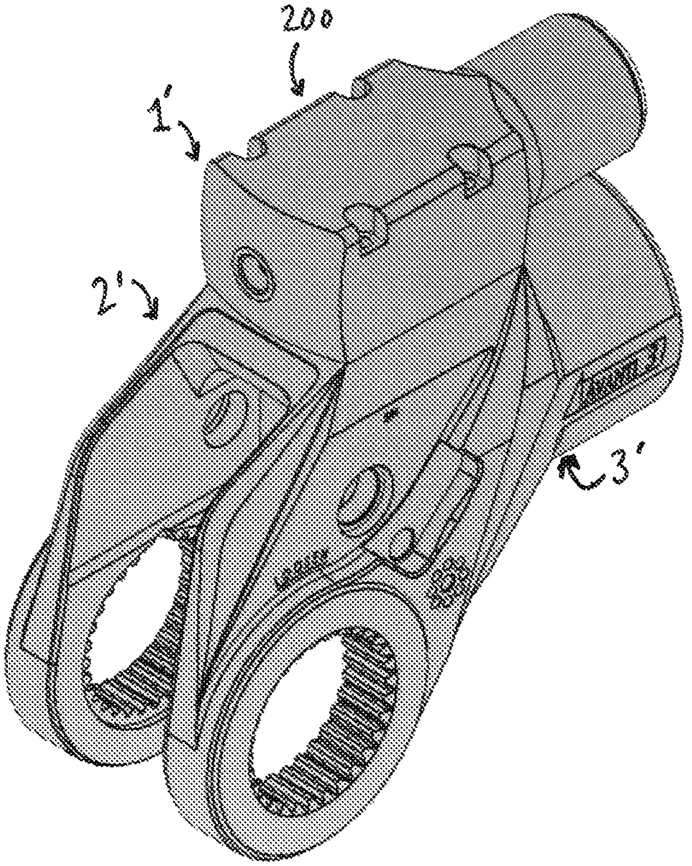
FIG. 3 is a perspective view of a second embodiment of an apparatus.

Referring to FIG. 3, by way of example, this shows a second embodiment of an automatic piston return apparatus 200 attachable with a reaction support portion 3' of a housing 2' of a tool 1' for tightening or loosening threaded fasteners. Apparatus 200 differs from apparatus 100 accordingly, namely through use of a separate, bolted on chamber to provide the volume for storage of the pneumatic fluid.

Figure 4:
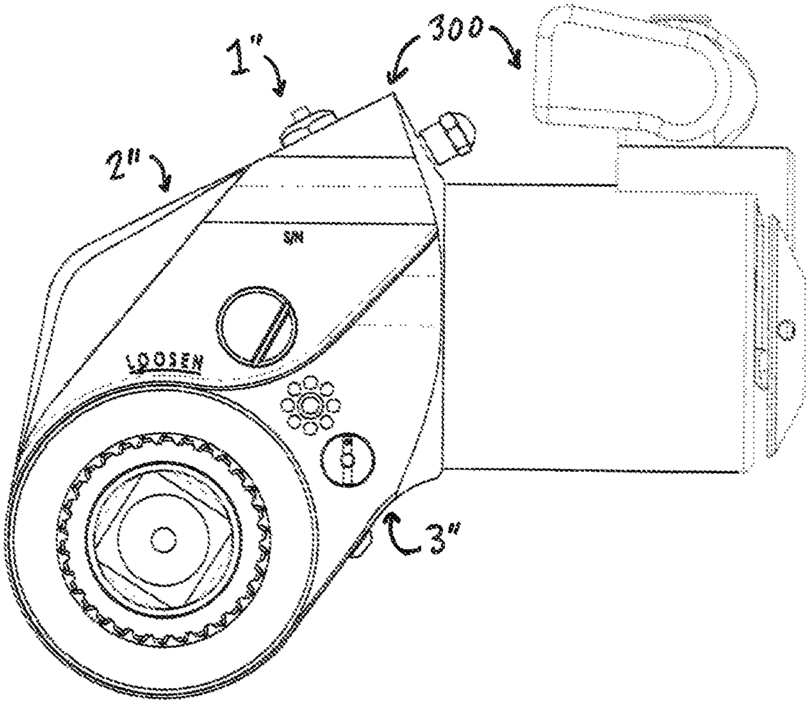
FIG. 4 is a side view of a third embodiment of an apparatus.

Referring to FIG. 4, by way of example, this shows a third embodiment of an automatic piston return apparatus 300 attachable with a reaction support portion 3" of a housing 2" of a tool 1" for tightening or loosening threaded fasteners. Apparatus 300 differs from apparatus 100 and apparatus 200 accordingly, namely through use of a hydraulic swivel assembly rotatable approximately 180°×360°×360°.

Note that assemblies 100, 200 and/or 300 may have one or more of the following, component parts, including: fluid-transmitting element(s); end cap(s) and cover(s); bracket(s); post(s); retaining nut(s); set screw(s); lock screw(s); and/or o-ring(s).

Note that assemblies 100, 200 and/or 300 may incorporate any known components, geometries and/or characteristics, particularly as discussed in the patents mentioned in the above section Cross Reference to Related Patents, entire copies of which are incorporated herein by reference.

It will be understood that each of the elements described above, or two or more together, may also find a useful application in other types of constructions differing from the types described above. The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilized for realizing the invention in diverse forms thereof.

While the invention has been illustrated and described as embodied in a fluid operated tool, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

When used in this specification and claims, the terms “comprising”, “including”, “having” and variations thereof mean that the specified features, steps or integers are included. The terms are not to be interpreted to exclude the presence of other features, steps or components.

What is claimed is:

1. An apparatus for automatic piston return in a hydraulically driven torque tool for tightening or loosening threaded fasteners, the apparatus including:

- a hydraulic assembly having:
  - a hydraulic swivel assembly;
  - a hydraulic cylinder assembly with:
    - a first end attachable to a housing and a piston assembly of the tool;
    - a second end attachable to the hydraulic swivel assembly;
- a pneumatic assembly having:
  - a pneumatic fill valve assembly;
  - a pneumatic cylinder assembly with:
    - a first end attachable to the housing of the tool, the pneumatic fill valve assembly and the first end of the hydraulic cylinder assembly;

a second end attachable to the second end of the hydraulic cylinder assembly and the hydraulic swivel assembly; and a pneumatic fluid conduit.

2. An apparatus according to claim 1 operating by either a pneumatic fluid, a spring, or both a pneumatic fluid and a spring which compresses during an advance stroke of a piston assembly of the tool and expands during a retract stroke of the piston assembly of the tool.

3. An apparatus according to claim 1 operating by a pneumatic fluid which compresses during an advance stroke of a piston assembly of the tool and expands during a retract stroke of the piston assembly of the tool.

4. An apparatus according to claim 1 wherein the hydraulic assembly and the pneumatic assembly are removably, sealably and/or fluidly attachable to each other and the tool to allow the pneumatic fluid to compress during an advance stroke of a piston assembly of the tool and to expand during a retract stroke of the piston assembly of the tool.

5. An apparatus according to claim 1 wherein a pneumatic fluid pressure vessel is defined by: a first static volume formed between an inner wall of the pneumatic assembly and an outer wall of the hydraulic assembly; a dynamic volume formed between an inner wall of the hydraulic assembly and an outer wall of a piston assembly of the tool; and a second static volume formed within a pneumatic fluid conduit connecting the pneumatic fluid conduit assembly, the first static volume and the dynamic volume.

6. An apparatus according to claim 1 wherein pressures of the pneumatic fluid and the hydraulic fluid may exceed approximately 400 psi and 10,000 psi, respectively.

7. An apparatus according to claim 1 wherein the tool requires a single hydraulic connection rather than a plurality of hydraulic connections.

8. An apparatus according to claim 7 wherein the single hydraulic connection is coaxial with a piston axis of the tool which minimizes the space required to accommodate the hydraulic connection to the tool for limited clearance bolting applications.

9. An apparatus according to claim 7 wherein the tool includes a quick connect coupler to the single hydraulic connection.

10. An apparatus according to claim 1 wherein the pneumatic fill valve assembly includes either a Schrader valve or a Presta valve.

11. An apparatus according to claim 1 wherein the pneumatic fill valve assembly includes a pneumatic fluid pressure sensor.

12. An apparatus according to claim 1 including:

the hydraulic assembly having a hydraulic cylinder assembly and a hydraulic connector assembly; and the pneumatic assembly having a pneumatic block assembly and a pneumatic fill valve assembly.

13. A hydraulically driven torque tool having an apparatus according to claim 1, 2, 3, 4, 5, 6, 7, 8, 9, 10, 11, or 12 to tighten the threaded fastener.

14. A system for fastening objects including:

a threaded fastener; and a hydraulically driven torque tool having an apparatus according to claim 1, 2, 3, 4, 5, 6, 7, 8, 9, 10, 11, or 12.

* * * * *